(12) United States Patent
Wendeberg et al.

(10) Patent No.: US 9,915,246 B2
(45) Date of Patent: Mar. 13, 2018

(54) WIND TURBINE ROTOR SHAFT ARRANGEMENT

(71) Applicants: Hans Wendeberg, Västra Frölunda (SE); Håkan Leander, Torslanda (SE); Jürgen Reichert, Donnersdorf (DE)

(72) Inventors: Hans Wendeberg, Västra Frölunda (SE); Håkan Leander, Torslanda (SE); Jürgen Reichert, Donnersdorf (DE)

(73) Assignee: AKTIEBOLAGET SKF, Gothenburg (SE)

( * ) Notice: Subject to any disclaimer, the term of this patent is extended or adjusted under 35 U.S.C. 154(b) by 303 days.

(21) Appl. No.: 14/705,063

(22) Filed: May 6, 2015

(65) Prior Publication Data
US 2015/0267687 A1    Sep. 24, 2015

Related U.S. Application Data

(63) Continuation of application No. PCT/SE2013/000128, filed on Aug. 18, 2013.

(51) Int. Cl.
*F03D 80/70*      (2016.01)
*F03D 11/00*      (2006.01)
(Continued)

(52) U.S. Cl.
CPC .......... *F03D 11/0008* (2013.01); *F03D 80/70* (2016.05); *F16C 19/547* (2013.01);
(Continued)

(58) Field of Classification Search
CPC ...... F03D 11/008; F03D 80/70; F16C 19/547; F16C 19/548; F16C 23/086;
(Continued)

(56) References Cited

U.S. PATENT DOCUMENTS

| | | | | |
|---|---|---|---|---|
| 7,384,239 B2* | 6/2008 | Wacinski | ............... | F03D 1/025 |
| | | | | 415/123 |
| 7,528,497 B2* | 5/2009 | Bertolotti | ............. | F03D 1/0658 |
| | | | | 290/44 |
| 2007/0154128 A1* | 7/2007 | Mikami | .................. | B61F 17/30 |
| | | | | 384/627 |

(Continued)

FOREIGN PATENT DOCUMENTS

| | | |
|---|---|---|
| CZ | 30296 B6 | 1/2012 |
| DE | 4402184 A1 | 8/1995 |

(Continued)

*Primary Examiner* — Aaron R Eastman
(74) *Attorney, Agent, or Firm* — Bryan Peckjian; SKF USA Inc. Patent Dept.

(57) ABSTRACT

A wind turbine rotor shaft arrangement, e.g. of horizontal type, comprising a rotor shaft for supporting wind turbine blades, a non-rotating first housing structure for supporting the rotor shaft, and a first rolling bearing arranged to support, in a first axial direction, the rotor shaft in relation to the first housing structure at a first support point. The first rolling bearing is a single row self-aligning bearing comprising an inner ring, an outer ring, and a set of rolling elements formed of rollers arranged in an intermediate configuration between the inner and outer rings. Each roller is a symmetrical bearing roller having a curved raceway-contacting surface arranged contacting a curved inner raceway of the inner ring and a curved outer raceway of the outer ring. A contact angle between each roller and the inner and/or outer raceway is inclined in relation to the radial direction of the rotor shaft.

12 Claims, 4 Drawing Sheets

(51) Int. Cl.
*F16C 19/54* (2006.01)
*F16C 23/08* (2006.01)

(52) U.S. Cl.
CPC .......... *F16C 19/548* (2013.01); *F16C 23/086* (2013.01); *F05B 2220/7066* (2013.01); *F16C 2240/34* (2013.01); *F16C 2300/14* (2013.01); *F16C 2360/31* (2013.01); *Y02E 10/722* (2013.01); *Y02E 10/725* (2013.01); *Y02E 10/726* (2013.01); *Y02P 70/523* (2015.11); *Y10T 29/49321* (2015.01)

(58) Field of Classification Search
CPC .............. F16C 2240/34; F16C 2300/14; F16C 2360/31; F05B 2220/7066; Y10T 29/49321; Y02P 70/523; Y02E 10/722; Y02E 10/725; Y02E 10/726
See application file for complete search history.

(56) References Cited

U.S. PATENT DOCUMENTS

| | | | |
|---|---|---|---|
| 2008/0272602 A1* | 11/2008 | Kim | H02K 7/083 |
| | | | 290/55 |
| 2009/0023544 A1* | 1/2009 | Nitzpon | F01D 11/001 |
| | | | 475/338 |
| 2010/0253087 A1 | 10/2010 | Lauke | |
| 2012/0055024 A1 | 3/2012 | Kawano et al. | |
| 2012/0141270 A1* | 6/2012 | Minadeo | F16C 33/6659 |
| | | | 416/1 |

FOREIGN PATENT DOCUMENTS

| | | |
|---|---|---|
| DE | 19704909 A1 | 8/1998 |
| DE | 102010054948 A1 | 6/2012 |
| GB | 2112085 A | 7/1983 |
| GB | 2362928 A | 12/2001 |
| WO | 2012130305 A1 | 10/2012 |

\* cited by examiner

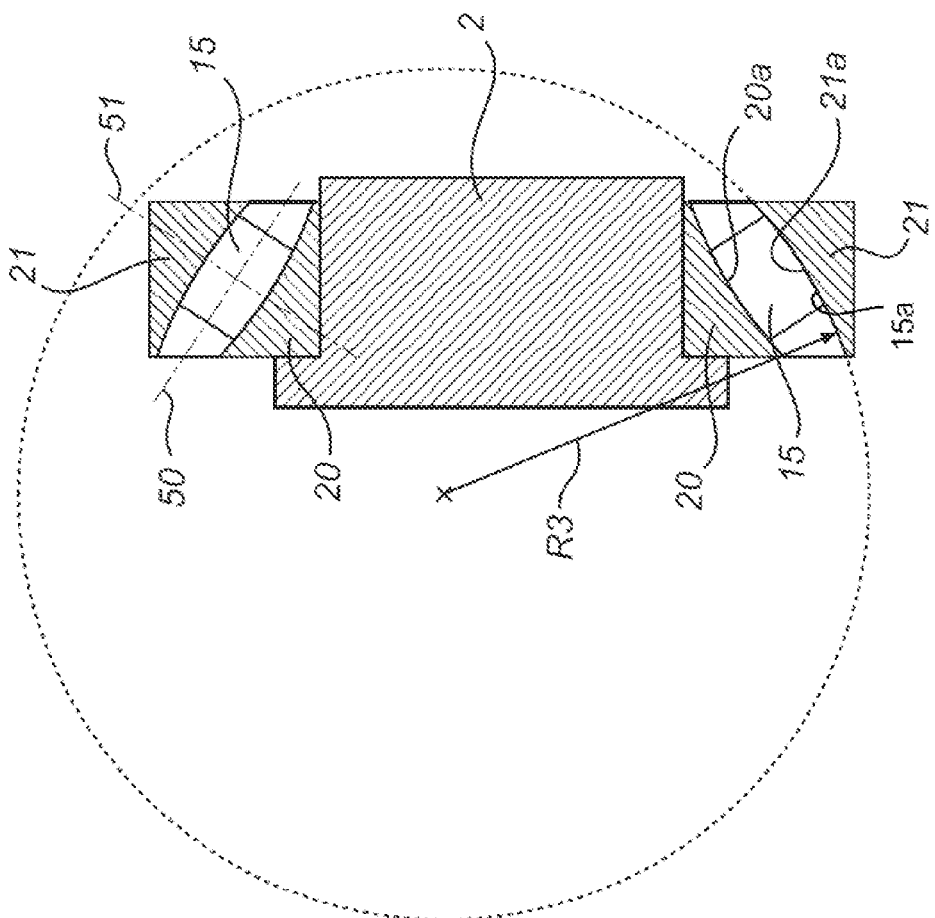
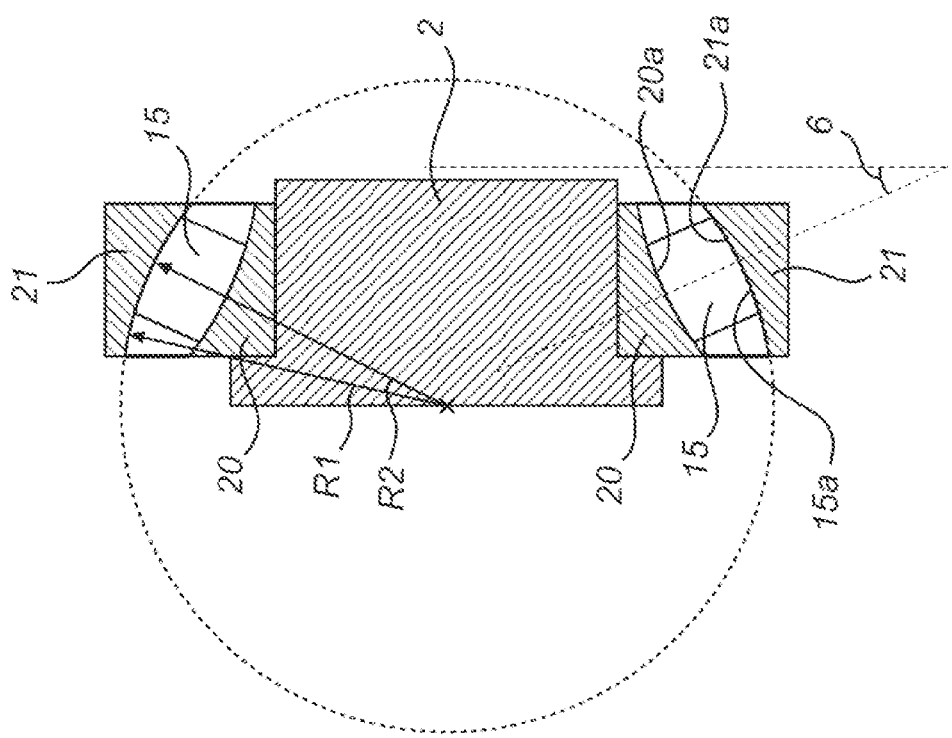
Fig. 3b
Fig. 3a

WIND TURBINE ROTOR SHAFT ARRANGEMENT

CROSS REFERENCE TO RELATED APPLICATION

This is a National Stage application claiming the benefit of International Application Number PCT/SE2013/000128 filed on 18 Aug. 2013 (18.08.2013), which claims the benefit of Sweden Patent Application 1200741-5 filed on 3 Dec. 2012 (03.12.2012) and Sweden Patent Application 1200500-5 filed on 21 Aug. 2012 (21.08.2012), which are all incorporated herein by reference in their entireties.

FIELD OF THE INVENTION

The present invention relates to rolling bearing arrangements for wind turbines, and more specifically to a wind turbine rotor shaft arrangement comprising a rotor shaft for supporting wind turbine blades, which rotor shaft is supported at a first support point with a self-aligning rolling bearing.

The present invention also relates to a method for manufacturing a wind turbine rotor shaft arrangement.

BACKGROUND ART

Due to the large dimensions and weight of wind turbines, the load bearing capabilities and performance of the bearing arrangement supporting the rotor shaft and wind turbine blades is of high importance. Typically, for a wind turbine of horizontal, or near horizontal, rotor shaft type, the bearing arrangement must support both axial and radial loads, wherein the axial loads commonly comprises axial loads transferred from the turbine blades during operation as well as axial loads arising from the weight of the rotor shaft and turbine blade arrangement which is commonly mounted with a tilted angle in relation to the horizontal plane in order to reduce the risk of collision between the turbine blades and the wind turbine tower. Also, the weight and size of the components as well as the location of the rotor arrangement in tower like structures increase the cost for replacement and servicing, if required.

Known bearing arrangements for supporting a given radial and axial load characteristic of a wind turbine rotor shaft, however, require high manufacturing precision of the bearings raceways and raceway-contacting surfaces of the rolling elements, as well as high precision of the alignment between the rotor shaft and bearing housings structures at different support points along the axis of the rotor shaft. Furthermore, complex roller raceway geometries comprising e.g. roller guiding sleeves increase the precision and alignment requirements of the bearings, as well as increasing the mass and cost of material of the complete wind turbine arrangement. Also, in order to provide suitable axial location function, the required axial and radial extension of known rolling bearing solutions increase the space requirements and the overall size and weight of the wind turbine nacelle framing.

SUMMARY OF THE INVENTION

In view of the above-mentioned and other drawbacks of the prior art, a general object of the present invention is to provide an improved wind turbine rotor shaft arrangement and a method for manufacturing a wind turbine rotor shaft arrangement.

These and other objects are met by the subject matters provided in the independent claims. Preferred embodiments of the invention are presented in the dependent claims.

According to a first aspect thereof, the present invention relates to a wind turbine rotor shaft arrangement, e.g. of horizontal type, comprising a rotor shaft for supporting wind turbine blades, a non-rotating first housing structure, or support structure, for supporting the rotor shaft, which first housing structure is arranged to be mounted to a wind turbine nacelle framing, or nacelle housing, and a first rolling bearing arranged to support, in a first axial direction, the rotor shaft in relation to the first housing structure at a first support point. Furthermore, the first rolling bearing is a single row self-aligning bearing comprising an inner ring, an outer ring, and a set of rolling elements formed of rollers arranged in an intermediate configuration between the inner and outer rings, wherein each roller is a symmetrical bearing roller and has a curved raceway-contacting surface arranged in contact with a curved inner raceway of the inner ring and in contact with a curved outer raceway of the outer ring, and wherein a contact angle between each roller and the inner and/or outer raceway is inclined in relation to the to the radial direction of the rotor shaft.

The invention is based on the realization by the inventors that an improved and more compact wind turbine rotor shaft arrangement is realized by providing a single row self-aligning roller bearing having a pronounced tilted contact angle. By tilting the contact angle, the solution allows for maintained axial load bearing capacity while the axial width and radial extension of the rolling bearing unit may be decreased, thereby reducing the nacelle weight of a finished wind turbine. For example, by having an inclined contact angle, the normal direction of the outer raceway, or complete roller contacting surface of the outer raceway, is angled in relation to the radial direction of the rotor shaft.

Also, the self-aligning function, due to the curved contacting surfaces between the rollers and raceways, allows for compensation of angular misalignment of the rotor shaft in relation to the first housing structure. Hence, the alignment requirements of the housing structure for the bearing when being mounted to and fixated in relation to the nacelle framing may be considerable reduced. The self-aligning capability of the first rolling bearing further allows for that the alignment requirements in relation to further rolling bearings and associated housing structures supporting the rotor shaft at a different support point along the rotor shaft, may be reduced which improves time and cost efficiency of the manufacturing process. For example, reduced alignment requirements allow for simplify mounting, dismounting and replacement of individual components of the rotor shaft arrangement.

Moreover, according to the invention, the weight of the rotor shaft arrangement may be reduced since the stiffness, and thereby the weight, of the shaft may be reduced, since bending deflections of the rotor shaft giving rise to angular misalignment at the support point may be compensated by the self-aligning capability of the first rolling bearing. Also bending deflections of the nacelle framing can be compensated by the self-aligning capability of the first rolling bearing.

The wind turbine rotor shaft arrangement according to the present invention is further advantageous in that the symmetrical rollers and corresponding raceways of the first rolling bearing allow for reliable operation as wells as cost and time efficient manufacturing. Furthermore, the symmetrical rollers are maintained in corrected alignment in relation to the inner and outer raceway in the axial direction during operation due to the adapted curved shaped of the rollers and raceways. Hence, there is no need for guiding flanges or guiding projections from the inner or outer the raceways of for maintaining the rollers in their correct interposed position between the inner and outer rings. The geometry of the roller elements and inner and outer raceways further reduces the static and dynamic friction of the bearing allowing for more efficient starting and output from a wind turbine arrangement during operation.

For example, by being symmetrical, each roller being part in the set of rolling elements of the bearing has a symmetrical shape, wherein the axial ends of the roller are equal, or symmetric, with each other, i.e. having similar dimensions, such as similar radial dimensions. In more detail, each roller may comprise a first axis of symmetry which coincides with the rotational axis of the roller, and a second axis of symmetry which is orthogonal to the first axis of symmetry. In other words, each roller may have a shape having at least two separate orthogonal axes of symmetry.

According to an exemplifying embodiment, the wind turbine rotor shaft arrangement further comprises a non-rotating second housing structure, or support structure, for supporting the rotor shaft, which second housing structure is arranged to be mounted to the wind turbine nacelle framing, and a second rolling bearing arranged to support, in a second opposite axial direction, the rotor shaft in relation to the second housing structure at a second support point, which second rolling bearing is a self-aligning bearing comprising an inner ring, an outer ring, and a set of rolling elements formed of rollers arranged in an intermediate configuration between the inner and outer rings, wherein each roller is a symmetrical bearing roller and has a curved raceway-contacting surface arranged in contact with a curved inner raceway of the inner ring and in contact with a curved outer race of the outer ring, and wherein the contact angle between each roller of the second set of rollers and the inner and/or outer raceway of the second rolling bearing is inclined in relation to the to the radial direction of the rotor shaft.

According to an exemplifying embodiment, the second rolling bearing is a single row bearing, i.e. comprising only a single row of rolling elements.

According to an exemplifying embodiment, the outer ring of the first rolling bearing is arranged at the first support point, and the outer ring of the second rolling bearing is arranged at the second support point, wherein the first and second support points are separately arranged in relation to each other along the axial direction of the rotor shaft. In other words, the outer rings of the respective rolling bearings are separated an axial distance from each other.

According to an exemplifying embodiment, the outer raceways of the first and second roller bearings are facing away from each other in the axial direction. Thereby, the first and second rolling bearings are arranged in an O-arrangement in relation to each other and cooperate to axially fixate the rotor shaft. For example, the first rolling bearing has a larger load bearing capacity in relation to the second rolling bearing in order to bear the axial load from the weight of a tilted rotor shaft arrangement and from the force transferred to the rotor shaft from the turbine blades during operation. The first and second rolling bearings may also be arranged to cooperate to axially fixate the rotor shaft by being arranged in an X-arrangement, wherein the outer raceways are facing in a direction towards each other.

For example, considering the first rolling bearing, the normal direction of the contacting surface of the outer raceway along the complete, or full length of the, raceway along the axial direction is inclined in relation to the radial direction of the rotor shaft in a direction away from the second roller bearing, and vice versa.

According to an exemplifying embodiment, the second rolling bearing is a single row spherical roller bearing or a single row toroidal roller bearing. By being a single row bearing, the bearing comprises, or only comprises, a single row of rolling elements which axially locate the rotor shaft in the second axial direction. Hence, at the second support point, the rotor shaft is only supported by the second rolling bearing, wherein the second rolling bearing comprises only one row of rollers.

Common for both spherical roller and toroidal roller bearing types is that each raceway of each bearing has a curved cross-section when taken in a plane coinciding with the axial direction of the inner or outer rings. Also, each roller is provided with a raceway contacting surface having a curved cross-section when taken in a plane coinciding with the rotational axis of the roller. In other words, the rollers are barrel-shaped having a convex raceway-contacting surface. Furthermore, for a spherical type bearing, the curvature of the outer raceway has a radius of curvature corresponding to, or being equal to, the radius of the outer raceway and the rollers are arranged to move in relation to the outer raceway and travel with the inner raceway during self-aligning movement of the spherical bearing. For the a toroidal type bearing, the curvature of the outer raceway has a radius of curvature exceeding the radius of the outer raceway, which allows for some axial displacement of the rollers in relation to the raceway, wherein the rollers are arranged to move in relation to both the outer raceway and the inner raceway during self-aligning movement of the toroidal bearing. For example, for the toroidal type bearing, the ratio between the curvature radius and the raceway radius is more than 1.1, or 1.2, or 1.5, 2, or 5.

According to an exemplifying embodiment, the first housing structure and second housing structure are arranged to be separately mounted in the nacelle framing. Thereby, mounting the housing structures is considerably facilitated and a wind turbine may be mounted and dismounted in a more efficient and cost effective manner. Alternatively, according to an exemplifying embodiment, the first housing structure and the second housing structure are integrally formed in a supporting housing structure unit arranged to be mounted in the nacelle framing. For example, the first and second housing structures are commonly formed in a one-piece supporting housing structure comprising axially separated support portions for receiving and securing the respective outer rings of the first and second rolling bearings.

According to an exemplifying embodiment, also the first rolling bearing is a single row spherical roller bearing or a single row toroidal roller bearing. Hence, the rotor shaft is only supported by the first rolling bearing at the first support point, wherein the first rolling bearing comprises only one row of rollers which axially locate the rotor shaft in the first axial direction.

According to an exemplifying embodiment, the contact angle of the first and/or second rolling bearing is between 10 and 45 degrees, or between 15 and 35 degrees. The contact angle may be defined as the angle between the line along which the resulting load is transmitted via a roller element from one raceway to another, typically along an axial center portion of the roller.

The contact angle of the first and second bearings may also be described as the angle between the rotational axis of the symmetrical rollers and the axial direction of the rotor shaft.

According to a further exemplifying embodiment of the present invention, it further relates to a wind turbine arrangement comprising the wind turbine rotor shaft arrangement and a nacelle framing, wherein the rotor shaft is supported by and mounted to the nacelle framing via the first and second housing structures.

According to a further exemplifying embodiment of the present invention, each housing structure is arranged radially outside the rotor shaft. For example, the first housing structure is arranged radially outside the rotor shaft, wherein the outer ring of the first bearing is attached to and fixated in relation to the first housing structure and the inner ring rotates with the rotor shaft during operation. Also, for the case comprising first and second rolling bearings, the first and the second housing structures may be arranged radially outside the rotor shaft, wherein the respective outer rings of the first and second rolling bearings is attached to and fixated in relation to the respective housing structures and the respective inner rings rotate with the rotor shaft during operation.

According to a yet an exemplifying embodiment of the present invention, each housing structure is arranged radially inside the rotor shaft. For example, the first housing structure is arranged radially inside the rotor shaft, wherein the inner ring of the first bearing is attached to and fixated in relation to the first housing structure and the outer ring rotates with the rotor shaft during operation. Also, for the case comprising first and second rolling bearings, the first and the second housing structures may be arranged radially inside the rotor shaft, wherein the respective rings of the first and second rolling bearings are attached to and fixated in relation to the respective first and second housing structures and the respective outer rings rotate with the rotor shaft during operation. For example, the rotor shaft has a tubular hollow shape, wherein the rolling bearings and housing structures are arranged inside the rotatable rotor shaft. According to an embodiment, the first housing structure, or both the first and the second housing structures are formed on a supporting housing structure extending axially into an axial opening of the hollow rotor shaft for supporting the rotor shaft from a radially inner position of the rotor shaft.

According to an exemplifying embodiment, the wind turbine rotor shaft arrangement comprises a hub unit for supporting the wind turbine blades, wherein rotor shaft is formed of a portion of the hub unit. Thereby a compact design of the wind turbine rotor shaft arrangement is provided, wherein the hub unit and rotor shaft are integrally formed. For example, the combined axial dimension and extension of the hub and rotor shaft may advantageously be reduced. According to an embodiment, the first rolling bearing is arranged in a built-in configuration in the hub unit, wherein the outer ring of the first rolling bearing is attached to and fixated in relation to the hub unit and rotates with the hub unit during operation. Alternatively, the inner ring of the first rolling bearing is attached to and fixated in relation to the hub unit and rotates with the hub unit during operation.

According to an exemplifying embodiment, the first and/or second rolling bearing may be mounted onto/into the rotor shaft with a conical or cylindrical fit. The bore of the first and/or second rolling bearing may be conical or cylindrical. When the bore is conical, the bearing may be mounted onto the shaft by axially driving up the bearing onto the shaft, which presents a corresponding conical surface. Thereby the bearing will be firmly attached to the shaft. If the first and second rolling bearing is mounted into a rotor shaft, the outer mounting surfaces of the outer rings of the rolling bearings may be conical or cylindrical.

According to various embodiments of the wind turbine rotor shaft arrangement, the first and/or second rolling bearings may be arranged with a positive internal operational clearance, negative internal operational clearance, or no internal operational clearance. For example, the bearings may be arranged to have substantially no axial play, or be arranged with a suitable axial play, depending on the preferred wind turbine rotor shaft design. The bearings may also be arranged with an operational clearance, or play, in the radial direction. The bearings may alternatively be arranged with a negative operational clearance, i.e. a preload, in order to e.g. enhance the stiffness of the bearing arrangement or to increase running accuracy. For example, the application of a preload may be provided by springs in order to prevent bearing damage as a result of sliding movements of the rolling elements.

Furthermore, the first and/or second rolling bearings may, according to various embodiments, be separable bearings, wherein the inner and outer rings and the set of rolling elements are separable from each other. Alternatively, the rolling bearings may be self-retaining such that the set of rolling elements and the inner and outer ring form a self-retaining bearing unit. For example, self-retention may be provided by provision of e.g. retention rings, retention sleeves, or retaining cages. The rolling bearings may also be semi-self-retaining such that only the set of rolling elements and one of the inner or outer rings form a self-retaining unit.

Moreover, according to alternative further embodiments of the wind turbine rotor shaft arrangement, the first and/or second rolling bearings may be provided with a coating for improved performance and operational reliability. In more detail, a suitable durable coating may be applied the respective rolling elements, inner raceways, outer raceways, inner rings, and/or outer rings. Also, a complete rolling bearing may be coated. For example, problems such as micropitting, smearing and inclusion-generated brittle flaking, and similar wear generated by e.g. high shear forces may be alleviated with a coating. A coating may also be employed to reduce or avoid asperity interaction between rolling elements and raceways and/or for dynamic polishing of the raceways during operation. According to various embodiments, the coating may be based on or comprise carbon, oxide, chromium, zinc, manganese and/or phosphate compounds. According to a further embodiment, the coating may be arranged to reduce or avoid dielectric breakdown of the rolling bearing components, for example by using a ceramic based coating acting as insulation.

According to a further aspect thereof, the present invention relates to a method for manufacturing a wind turbine rotor shaft arrangement, which method comprises providing a rotor shaft for supporting wind turbine blades, supporting, in a first axial direction, the rotor shaft in relation to a non-rotating first housing structure, or support structure, at a first support point by a single row self-aligning first rolling bearing comprising one row of rolling elements formed of rollers, wherein each roller is a symmetrical bearing roller, and wherein the first rolling bearing is provided with a pronounced contact angle in relation to the radial direction of the rotor shaft. The method provides an improved wind turbine rotor shaft arrangement which is advantageous in similar manners as described in relation to the first aspect of the present invention.

According to a further exemplifying embodiment of the method, it comprises supporting, in a second opposite axial direction, the rotor shaft in relation to a non-rotating second housing structure, or support structure, at a second support point by a self-aligning second rolling bearing comprising one row of rolling elements formed of rollers, wherein each roller of the second rolling bearing is a symmetrical bearing roller, and wherein the second rolling bearing is provided with a pronounced contact angle in relation to the radial direction of the rotor shaft.

By being non-rotating, the first and second housing structures are to be understood to be fixed in relation to the main rotating movement of the rotor shaft during operation. However, the non-rotating housing structures may undergo other rotational movements, such as rotational movement when a complete wind turbine nacelle unit is rotated to face the wind in order to achieve suitable operation and favorable electric power generation.

Each one of the first and the second housing structures may have different design. For example, housing structure may refer to a supporting case or enclosure which supports and fixates e.g. the inner or outer rings of the rolling bearings. In more detail, housing structure may for example form an enclosing casing for a rolling bearing, wherein the rotor shaft rotates in the enclosing housing structure. However, the housing structure may also form a non-rotating support structure which supports and fixates e.g. the inner or outer rings of the rolling bearings, wherein the housing structure is not enclosing the rolling bearing. Instead, the housing structure may form a non-rotating support structure which is arranged in a radially inner arrangement inside a hollow rotor shaft, wherein the rolling bearing supports the hollow rotor shaft in relation to the radially inner support structure in a rotatable manner.

Generally, other objectives, features, and advantages of the present invention will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein:

FIGS. 3a-b are enlarged schematic cross-sectional views of alternative embodiments of the rolling bearings of the wind turbine rotor shaft arrangement according to the present invention;

Figure 1:
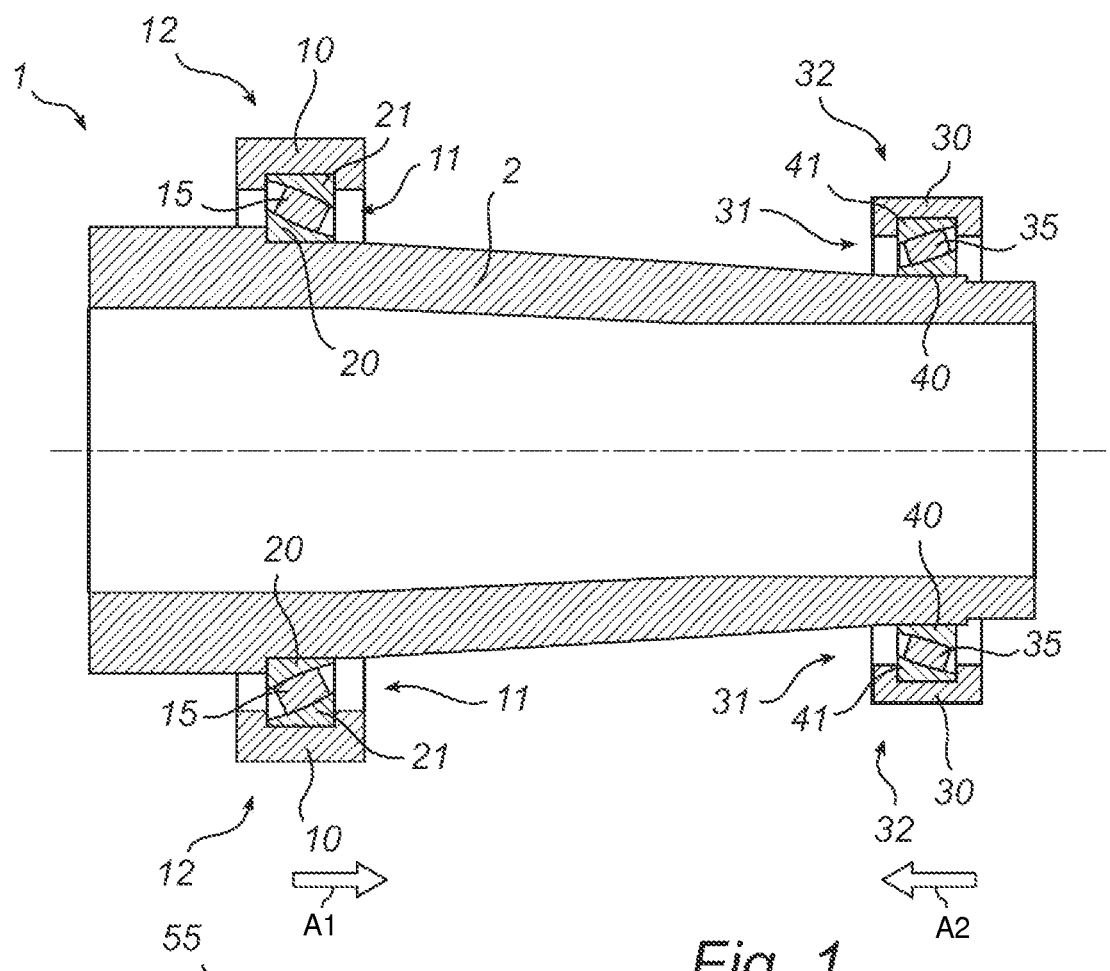
FIG. 1 is a schematic cross-sectional view of an embodiment of the wind turbine rotor shaft arrangement according to the present invention.

It should be understood that the drawings are not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

In the drawings, similar, or equal elements are referred to by equal reference numerals.

In FIG. 1, a wind turbine rotor shaft arrangement 1 comprising a rotor shaft 2 for supporting wind turbine blades is illustrated, which rotor shaft 2 extends axially along a rotor axis. The rotor shaft 2 is arranged to be rotatably mounted in a nacelle framing arranged in the top of a towerlike support body of a wind turbine having a horizontal, or near horizontal, orientation of the rotor shaft. However, the wind turbine rotor shaft arrangement 1 is not limited to a horizontal type orientation and may also be used in wind turbines applications involving tilted and vertical type rotor shaft orientations. The orientation of the rotor shaft is defined in relation to its intended mounted operational position in a nacelle framing of an operational wind turbine.

As illustrated, a non-rotating first housing structure 10 is provided for supporting the rotor shaft 2 in relation to a wind turbine nacelle framing. For example, the housing structure 10 is arranged to be mounted to a wind turbine nacelle framing, or the housing structure 10 forms part of a wind turbine nacelle framing structure. A first rolling bearing 11 is further provided to support the rotor shaft 2 in relation to the first housing structure 10 in a first axial direction A1. The first rolling bearing 11 rotatably supports and connects the rotor shaft 2 to the first housing structure 10 at a first support point 12. The first rolling bearing is a self-aligning bearing comprising an inner ring 20, an outer ring 21, and a set of rolling elements formed of rollers 15 arranged in an intermediate configuration between the inner and outer rings. The outer ring 21 is attached to and fixated in relation the first housing structure 10. The inner ring 20 is attached to and fixated in relation to the radially inner rotor shaft 2. The set of rollers 15 are circumferentially arranged around the rotor shaft 2 in a first row. Furthermore, each roller 15 is a symmetrical bearing roller and has a curved raceway-contacting surface arranged in contact with a curved inner raceway of the inner ring 20 and in contact with a curved outer raceway of the outer ring 21 in order to allow for angular displacement of the rotor shaft 2 in relation to the first housing structure 10. Each roller 15 has a symmetrical convex, or barrel-shaped, profile.

As further illustrated, the first rolling bearing 11 has a pronounced tilted contact angle. In other words, the contact angle between each roller 15 and the inner and/or outer raceways is inclined in relation to the radial direction of the rotor shaft 2 in order to transfer axial loads. By having a fully tilted contact angle geometry as shown in FIG. 1, wherein the complete raceway-contacting surface of each one of the rollers 15 are at least partially inclined to transfer axial loads, the axial load bearing capacity of the first roller bearing is considerably improved. Furthermore, the pronounced tilted contact angle of the first rolling bearing for transferring axial loads may entail that the rollers, during operation, are limited to adjust, or move, axially in relation to the outer raceway of the outer ring in an active outer raceway region, wherein the whole surface of the active outer raceway region is tilted in relation to the radial direction of the rotor axis. Also, the configuration of the first rolling bearing allows for reduced or minimal axial and radial width of the bearing arrangement, while the angular self-aligning capacity of the first rolling bearing considerably reduces the manufacturing precision and mounting of the arrangement.

As further illustrated in FIG. 1, the rotor shaft 2 is also rotatably supported at a second support point 32 which is axially separated from the first support point 12. In more detail, a non-rotating second housing structure 30 is provide at the second support point 32 for supporting the rotor shaft 2 in relation to a wind turbine nacelle framing. For example, the housing structure 30 is arranged to the mounted to a wind turbine nacelle framing or the second housing structure 30 also forms part of the nacelle framing structure. A second rolling bearing 31 is provided to rotatably support the rotor shaft 2 in relation to the second housing structure 30 in a second axial direction A2 being opposite in relation to the first axial direction A1. Thereby, the first and second rolling bearings cooperate to fully axially locate and secure the rotor shaft in relation to the first and second housing structures and the nacelle framing.

The second rolling bearing 31 is also a self-aligning bearing and comprises an inner ring 40, an outer ring 41, and a second set of rolling elements formed of rollers 35 arranged in an intermediate configuration between the inner and outer rings 40 and 41 of the second rolling bearing 31. In a similar manner as described in relation to the first rolling bearing 11, the second set of rollers 35 are circumferentially arranged around the rotor shaft 2 in a second row. Furthermore, each roller 35 is a symmetrical bearing roller and has a curved raceway-contacting surface arranged in contact with a curved inner raceway of the inner ring 40 and in contact with a curved outer raceway of the outer ring 41 in order to allow for angular displacement of the rotor shaft 2 in relation to the second housing structure 30. Moreover, each roller 35 has a symmetrical convex, or barrel-shaped, profile, i.e. an axially center portion having an increase radial width in relation to the opposite axial end portions.

The second rolling bearing 31 has a pronounced tilted contact angle which is tilted in opposite direction in relation of the tilt angle direction of the first rolling bearing. As shown, the contact angle between each roller 35 and the inner and/or outer raceways is inclined in relation to the radial direction of the rotor shaft in order to transfer axial loads. By having a fully tilted contact angle geometry as shown in FIG. 1, wherein the complete raceway-contacting surface of each one of the rollers 35 are at least partially inclined to transfer axial loads in the second axial direction, the axial load bearing capacity of the second roller bearing is considerably improved. Furthermore, the pronounced tilted contact angle of the second rolling bearing for transferring axial loads may alternatively or additionally entail that the rollers, during operation, are limited to adjust, or move, axially in relation to the outer raceway of the outer ring of the second rolling bearing in an active outer raceway region, wherein the whole surface of the active outer raceway region is tilted in relation to the radial direction of the rotor axis. Also, the configuration of the second rolling bearing 31 allows for reduced or minimal axial and radial width of the bearing arrangement, while the angular self-aligning capacity of the first rolling bearing considerably reduces the manufacturing precision and mounting of the arrangement.

For example, the first and second rolling bearings may be separated a distance, which distance is equal to or exceeds 50%, or 75%, or 100%, or 150% of the outer diameter of the rotor shaft at the first support point.

As shown, the outer raceway of the first rolling bearing 11 is facing in the second axial direction A2, away from the second rolling bearing 31, and the outer raceway of the second rolling bearing 31 is facing in the first axial direction A1, away from the first rolling bearing 11. In other words, the first and second rolling bearings 11 and 31 are arranged in an axially separated back-to-back configuration, i.e. in an O-arrangement, arranged to accommodate axial loads in both axial directions but only with one rolling bearing in each axial direction, wherein the load lines of the bearings diverge towards the axis of the rotor shaft 2. The configuration and inclination angles of the first and second rolling bearings 11 and 31 may also be arranged in an alternate configuration, wherein the outer raceway of the first rolling bearing 11 is facing in the first axial direction A1 towards the second rolling bearing 31, and the outer raceway of the second rolling bearing 31 is facing in the second axial direction A2 towards the first rolling bearing 11. In other words, the first and second rolling bearings are arranged in an axially separated face-to-face configuration, i.e. in an X-arrangement as illustrated in e.g. FIG. 4, arranged to accommodate axial loads in both axial directions but only with one rolling bearing in each axial direction, wherein the load lines of the bearings converge towards the axis of the rotor shaft 2.

As further shown, the wind turbine rotor shaft arrangement 1 is provided with a first and second rolling bearings of different size and load bearing capacity. Thereby, the arrangement is configured for different axial load bearings capacity in the first and second axial directions, allowing for a manufacturing of compact wind turbines with reduced weight.

According to further exemplifying embodiments, the first and/or second rolling bearings 11 and 31 of the wind turbine rotor shaft 1 may comprises cages, or retainers, for the rolling elements. The cage may be guided and maintained in an intended position in the rolling bearing by either one of the inner or outer ring. The cage may also be guided on a separate guiding ring. Furthermore, the cage may also be guided by the rolling elements. For example, the cage may be formed a metallic and/or polymeric material. The cage may further be arranged to form the rolling elements and at least one of the inner or outer ring into a self-contained unit which is held together as a single unit by the cage. The wind turbine rotor arrangement may also comprise cages and/or guide rings for guiding the cage which are arranged to lift the bearing or parts of the bearing.

Moreover, the first and second rolling bearing may comprise seals. For example, the seals are attached to at least one of the inner and outer rings. According to optional embodiments, the rotor shaft 2 may have a tapered or cylindrical bore. Also, each one of the inner rings 20 and 40 may have tapered or cylindrical bores, for example for providing attachment been the inner and outer rings and the housing structures and rotor shaft.

Figure 2:
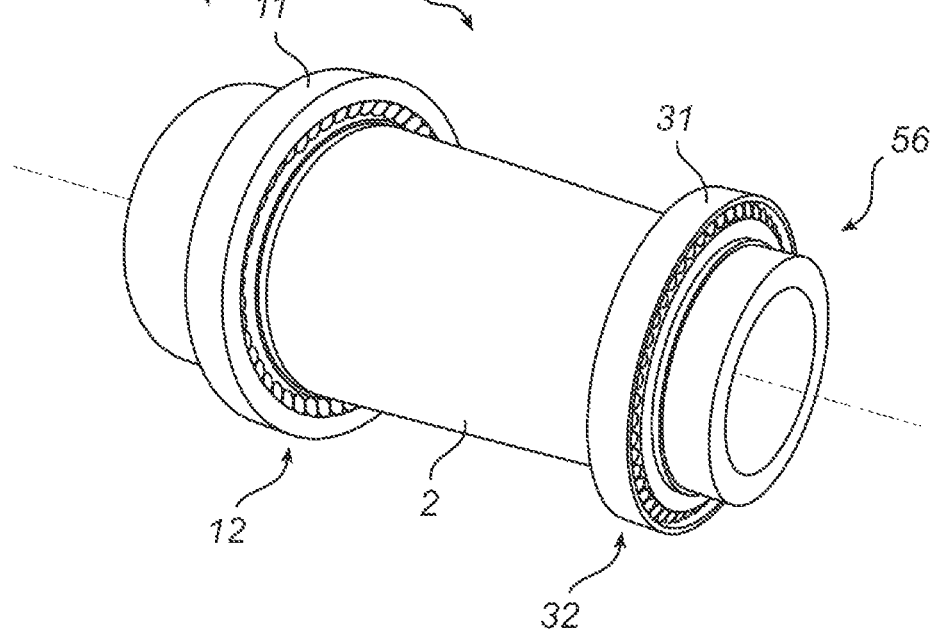
FIG. 2 is a schematic perspective view of an embodiment of the wind turbine rotor shaft arrangement according to the present invention.

In FIG. 2, a schematic partial perspective view of an embodiment of the wind turbine rotor shaft arrangement 1 is shown. The first and second rolling bearings 11 and 31 are separately attached to the rotor shaft 2 and rotatably support the rotor shaft at the respective first and second support points 12 and 32. According to an embodiment, the rotor shaft 2 is arranged to support and be attached to a wind turbine rotor arrangement comprising pitch-adjustable turbine blades at a first support portion 55 formed at the axial end adjacent the first support point. The rotor shaft may further be connected to a gear box for shifting the rotational speed of the rotor shaft 2 into a suitable rotational speed for an electric generator. The rotor shaft may also be directly coupled to a generator such that the rotational speed of the generator during operation equals the rotational speed of the rotor shaft 2. The gear box or generator may for example be attached to a second attachment portion 56 of the rotor shaft 2 being located at the opposite axial end of the rotor shaft 2 in relation to the first support portion 55, i.e. at the axial end of the rotor shaft 2 adjacent the second support point 32.

Even though the rotor shaft 2 of the wind turbine rotor shaft arrangement 1 is supported by first and second rolling bearings 11 and 31 as illustrated in FIGS. 1 and 2, there are various wind turbine bearing designs that are possible according to the present invention. For example, the rotor shaft 2 may be support by a two-point wind turbine bearing design, wherein the two points are formed of the first and second support points and the respective first and second rolling bearings 11 and 31, and wherein a gear box for shifting the rotational speed only acts as a torque converter. The second rolling bearing 31 supporting the rotor shaft 2 may also be integrally formed in the gear box such that the gear box itself supports the rotor shaft 2.

For example, according to an exemplifying embodiment, the rotor shaft 2 of the wind turbine rotor shaft arrangement 1 is supported by a three-point wind turbine bearing design, wherein the second rolling bearing 31 forms part of, or is integrated in, a gear box, which the gear box comprises a third rolling bearing which acts to support the rotor shaft 2 and which is separated from the second rolling bearing and arranged at a third support point along the rotor axis 2.

Furthermore, the wind turbine rotor shaft arrangement 1 may form part of a hydraulic wind turbine arrangement comprising a hydraulic drive-train for driving a generator. For example, the rotor shaft 2 may be coupled to a hydraulic pump arranged in the nacelle and which is coupled to a ground-based hydraulic motor and generator arrangement, such as an in-line or bent-axis generator motor.

According to various embodiments, components of a wind turbine arrangement, such as gearboxes, hydraulic devices such as pumps, generator devices, etc., can be mounted and/or coupled to the rotor shaft 2 between the first and second rolling bearings 11 and 31 and/or on the first and/or second support portions 55 and 56 of the rotor shaft 2.

Moreover, the axially separated first and second rolling bearings 11 and 31 may be arranged to have substantially no axial play, or be arranged with a suitable axial play, depending on the preferred wind turbine rotor shaft design.

In FIGS. 3a-b, two alternative enlarged schematic cross-sectional views of alternative embodiments of the first rolling bearing 11 at the first support point of a solid rotor shaft 2 are shown. The rotors shaft 2 is attached to an inner ring 20 having an inner raceway 20a and an outer ring 21 having an outer raceway 21a and intermediate symmetrical rollers having a raceway-contacting surface 15a, wherein the contact angle between of the first roller bearing 11 is indicated by the angle 6, as shown in FIG. 3a.

With reference to FIG. 3a, the first roller bearing is a spherical self-aligning roller bearing, wherein the outer raceway 21 has a spherical geometry, as indicated by the dotted circle having radius R1. In more detail, the radius of curvature of the outer raceway 21a is R1 which corresponds to the radial dimension of the first rolling bearing, such that a radial center point of the radius R1 of the outer raceway on respective radial sides of the rotor shaft 2 coincide. Also the curvature of the raceway-contacting surface of the rollers 15 are adapted to the curvature of the outer raceway 21a and have a radius R2. For example, radius R2 equals, or substantially equals, the radius R1.

With reference to FIG. 3b, the first rolling bearing is a toroidal roller bearing having self-aligning capabilities. In this embodiment, the radius of curvature of the outer raceway 21a is R3, which is larger than the radial dimension of the first rolling bearing, such that a radial center point of the radius R3 of the outer raceway 21a is off-set in relation to the center axis of the rotor shaft 2. Thereby, respective center points of the radius of curvature of the outer raceway 21a on respective radial sides of the rotor shaft 2 do not coincide. The increased radius of curvature of the outer raceway 21a in relation to the radial dimension of the bearing allows for increased axial movement of the rollers 15 in relation to the outer raceway 21a in the axial direction of the rollers 15, as indicated by 50. The respective axes 50 and 51 further indicated a first and second axis of symmetry of the rollers 15, which axes are orthogonal in relation to each other.

Mainly the first rolling bearing 11 is illustrated and described in relation to FIGS. 3a-b. It is noted, however, that the second rolling bearing 31 may be arranged in a similar and corresponding manner with corresponding features as the embodiments of the first rolling bearing 11 described in relation to and illustrated in FIGS. 3a-b.

Figure 4:
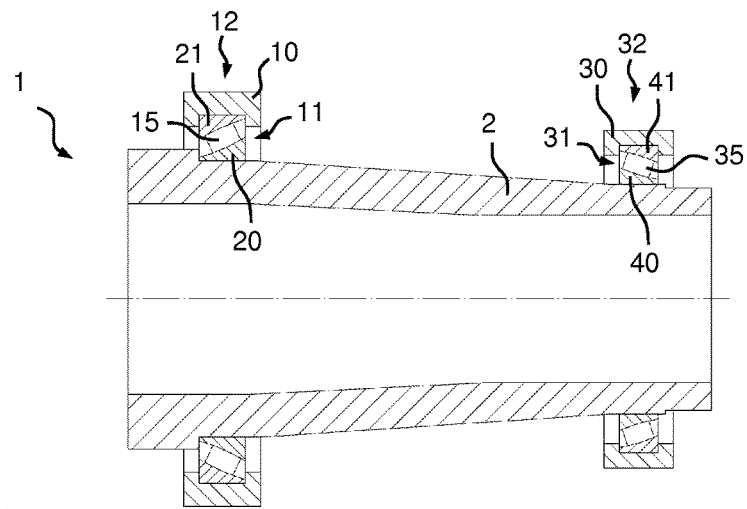
FIG. 4 is a schematic cross-sectional view of an embodiment of the wind turbine rotor shaft arrangement according to the present invention, wherein the first and second rolling bearings are arranged in an X-arrangement.

In FIG. 4, a schematic cross-sectional view of an embodiment of the wind turbine rotor shaft arrangement 1 is illustrated, which arrangement is arranged and configured in a similar manner as the wind turbine rotor shaft arrangement as described with reference to FIG. 1, unless stated or illustrated differently. In particular, the wind turbine rotor shaft arrangement 1 in FIG. 4 differs in that the first and second rolling bearings are arranged in an axially separated face-to-face configuration, i.e. in an X-arrangement wherein the load transfer lines of the respective rolling bearings converges, in a radial inward direction, axially towards each other.

Figure 5:
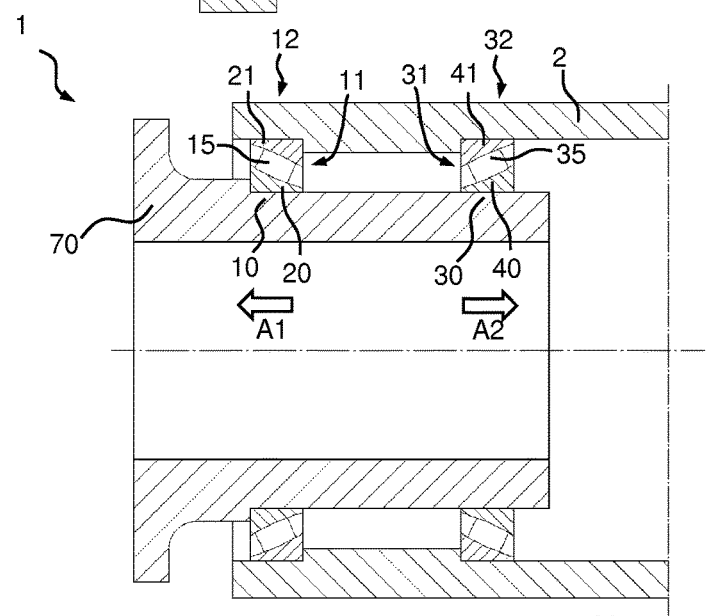
FIG. 5 is a schematic cross-sectional view of an embodiment of the wind turbine rotor shaft arrangement according to the present invention, comprising load bearing rolling bearings which are arranged radially inside the rotor shaft.

In FIG. 5, a schematic cross-sectional view of an alternative embodiment of the wind turbine rotor shaft arrangement 1 according to the present invention is shown. A radially inner non-rotating first housing structure 10 is provided in a supporting housing structure 70 for supporting a radially outer rotor shaft 2 in relation to a wind turbine nacelle framing (not depicted). A first rolling bearing 11 is further provided to support the rotor shaft 2 in relation to the first housing structure 10 in a first axial direction A1. The first rolling bearing 11 rotatably supports and connects the rotor shaft 2 to the first housing structure 10 at a first support point 12. The first rolling bearing is a self-aligning bearing comprising an inner ring 20, an outer ring 21, and a set of rolling elements formed of rollers 15 arranged in an intermediate configuration between the inner and outer rings. The inner ring 20 is attached to and fixated in relation the first housing structure 10. The outer ring 21 is attached to and fixated in relation to the radially outer rotor shaft 2.

The set of rollers 15 are circumferentially arranged in a first row around the inner ring 20 and the radially inner housing structure 10. Furthermore, each roller 15 is a symmetrical bearing roller and has a curved raceway-contacting surface arranged in contact with a curved inner raceway of the inner ring 20 and in contact with a curved outer raceway of the outer ring 21 in order to allow for angular displacement of the rotor shaft 2 in relation to the first housing structure 10. Each roller 15 has a symmetrical convex, or barrel-shaped, profile.

As further illustrated, the first rolling bearing 11 has a pronounced tilted contact angle. In other words, the contact angle between each roller 15 and the inner and/or outer raceways is inclined in relation to the radial direction of the rotor shaft 2 in order to transfer axial loads. By having a fully tilted contact angle geometry as shown in FIG. 5, wherein the complete raceway-contacting surface of each one of the rollers 15 are at least partially inclined to transfer axial loads, the axial load bearing capacity of the first roller bearing is considerably improved. Furthermore, the pronounced tilted contact angle of the first rolling bearing for transferring axial loads may entail that the rollers, during operation, are limited to adjust, or move, axially in relation to the outer raceway of the outer ring in an active outer raceway region, wherein the whole surface of the active outer raceway region is tilted in relation to the radial direction of the rotor axis. Also, the configuration of the first rolling bearing allows for reduced or minimal axial and radial width of the bearing arrangement, while the angular self-aligning capacity of the first rolling bearing considerably reduces the manufacturing precision and mounting of the arrangement.

As further illustrated in FIG. 5, the radially outer rotor shaft 2 is also rotatably supported at a second support point 32 which is axially separated from the first support point 12. In more detail, a non-rotating second housing structure 30 is formed in the supporting housing structure 70 at the second support point 32 for supporting the radially outer rotor shaft 2 in relation to a wind turbine nacelle framing. A second rolling bearing 31 is provided to rotatably support the rotor shaft 2 in relation to the second housing structure 30 in a second axial direction A2 being opposite in relation to the first axial direction A1. Thereby, the first and second rolling bearings cooperate to fully axially locate and secure the rotor shaft in relation to the first and second housing structures and the nacelle framing.

The second rolling bearing 31 is also a self-aligning bearing and comprises an inner ring 40, an outer ring 41, and a second set of rolling elements formed of rollers 35 arranged in an intermediate configuration between the inner and outer rings 40 and 41 of the second rolling bearing 31.

The inner ring 40 is attached to and fixated in relation the first housing structure 30, and the outer ring 41 is attached to and fixated in relation to the radially outer rotor shaft 2.

In a similar manner as described in relation to the first rolling bearing 11, the second set of rollers 35 are circumferentially arranged in a second row around the inner ring 40 and the radially inner housing structure 30. Furthermore, each roller 35 is a symmetrical bearing roller and has a curved raceway-contacting surface arranged in contact with a curved inner raceway of the inner ring 40 and in contact with a curved outer raceway of the outer ring 41 in order to allow for angular displacement of the rotor shaft 2 in relation to the second housing structure 30 during operation. Moreover, each roller 35 has a symmetrical convex, or barrel-shaped, profile, i.e. an axially center portion having an increase radial width in relation to the opposite axial end portions.

The second rolling bearing 31 has a pronounced tilted contact angle which is tilted in opposite direction in relation of the tilt angle direction of the first rolling bearing. As shown, the contact angle between each roller 35 and the inner and/or outer raceways is inclined in relation to the radial direction of the rotor shaft in order to transfer axial loads. By having a fully tilted contact angle geometry as shown in FIG. 5, wherein the complete raceway-contacting surface of each one of the rollers 35 are at least partially inclined to transfer axial loads in the second axial direction, the axial load bearing capacity of the second roller bearing is considerably improved. Furthermore, the pronounced tilted contact angle of the second rolling bearing for transferring axial loads may alternatively or additionally entail that the rollers, during operation, are limited to adjust, or move, axially in relation to the outer raceway of the outer ring of the second rolling bearing in an active outer raceway region, wherein the whole surface of the active outer raceway region is tilted in relation to the radial direction of the rotor axis. Also, the configuration of the second rolling bearing 31 allows for reduced or minimal axial and radial width of the bearing arrangement, while the angular self-aligning capacity of the first rolling bearing considerably reduces the manufacturing precision and mounting of the arrangement.

For example, the first and second rolling bearings may be separated a distance, which distance is equal to or exceeds 50%, or 75%, or 100%, or 150% of the inner diameter of the rotor shaft at the first support point.

As shown in FIG. 5, the outer raceway of the first rolling bearing 11 is facing in the first axial direction A1, away from the second rolling bearing 31, and the outer raceway of the second rolling bearing 31 is facing in the second axial direction A2, away from the first rolling bearing 11. In other words, the first and second rolling bearings 11 and 31 are arranged in an axially separated back-to-back configuration, i.e. in an O-arrangement, arranged to accommodate axial loads in both axial directions but only with one rolling bearing in each axial direction, wherein the load lines of the bearings diverge towards the axis of the rotor shaft 2.

As further illustrated, the rotor shaft 2 forms a hollow cylindrical body, wherein the non-rotating housing structures 10 and 30 for accommodating the rolling bearings, which bearings are arranged to rotatably support the rotor shaft 2, are arranged radially inside the hollow rotor shaft 2. The housing structures 10 and 30 are formed by a supporting housing structure 70 which extend axially into the radially inner void of the hollow rotor shaft 2.

Figure 6:
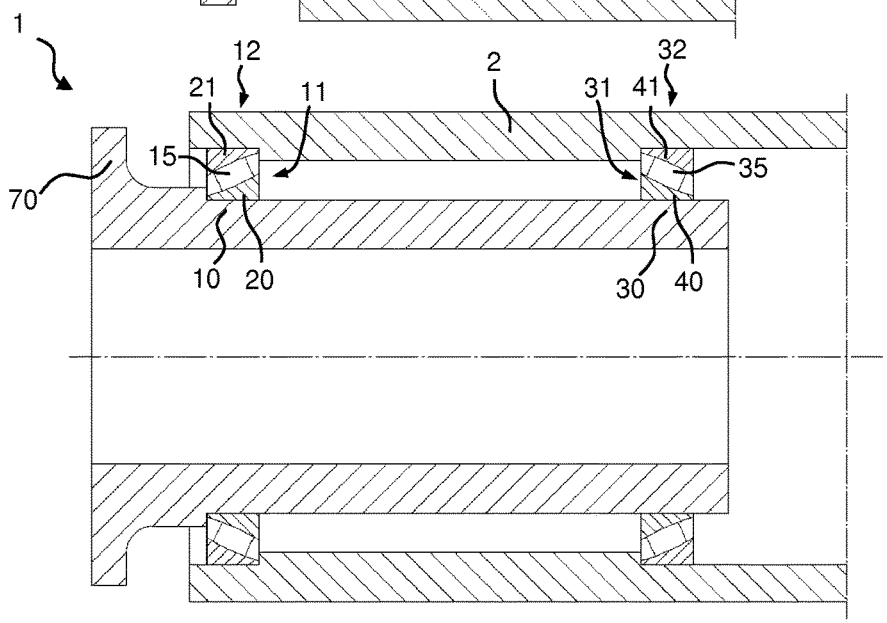
FIG. 6 is a schematic cross-sectional view of an embodiment of the wind turbine rotor shaft arrangement according to the present invention, comprising load bearing rolling bearings which are arranged radially inside the rotor shaft, wherein the first and second rolling bearings are arranged in an X-arrangement.

In FIG. 6, a schematic cross-sectional view of an embodiment of the wind turbine rotor shaft arrangement 1 is illustrated, which arrangement is arranged and configured in a similar manner as the wind turbine rotor shaft arrangement as described with reference to FIG. 5, unless stated or illustrated differently. In particular, the wind turbine rotor shaft arrangement 1 in FIG. 6 differs in that the first and second rolling bearings are arranged in an axially separated face-to-face configuration, i.e. in an X-arrangement, wherein the load transfer lines of the respective rolling bearings converges, in a radial inward direction, axially towards each other. According to an embodiment, the curvature of the respective raceways of the outer rings of the first and second rolling bearing 11 and 31 does not conform. In other words the curvature of the respective raceways of the outer rings of the first and second rolling bearing 11 and 31 does not align to form a common spherical geometry.

Figure 7:
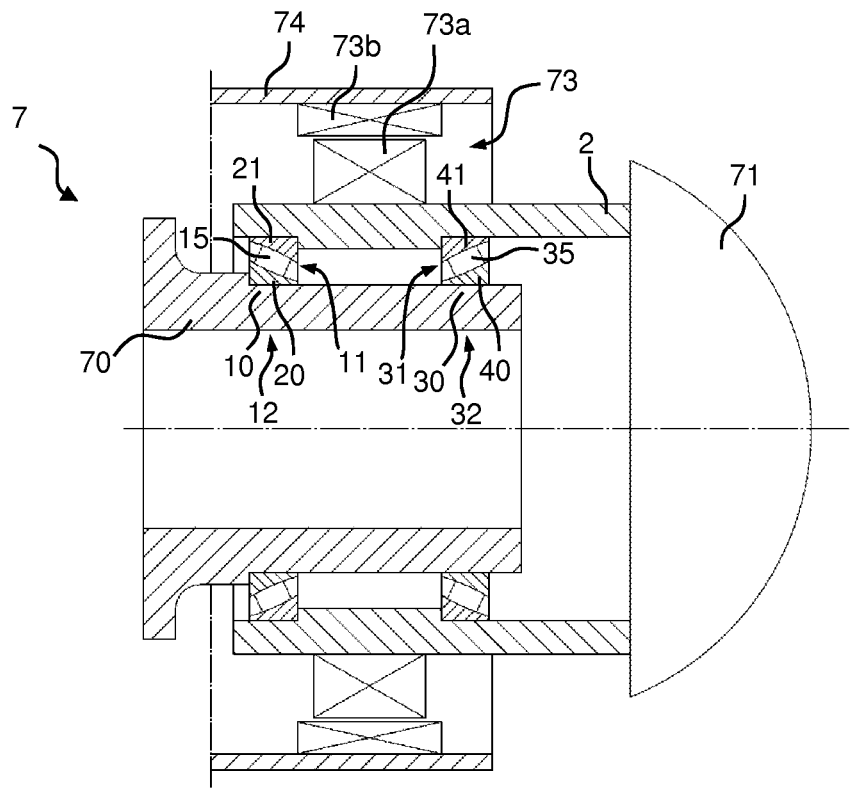
FIG. 7 is a schematic cross-sectional view of an embodiment of the wind turbine rotor shaft arrangement according to the present invention, comprising a radially outer generator and a hub unit for supporting wind turbine blades, which hub unit is arranged on an axial end of the rotor shaft.

In FIG. 7, a schematic cross-sectional view of an embodiment of the wind turbine rotor shaft arrangement 7 according to the present invention is illustrated. The arrangement 7 comprises a radially outer generator 73 for generation of electric power, and a hub unit 71 for supporting wind turbine blades (not shown), which hub unit 71 is arranged on an axial end of the rotor shaft 2. The generator 73 comprises a radially inner rotor 73a which is attached on and arranged to rotate with the rotor shaft 2. During operation, the rotor 73a cooperates with a stator 73b which is attached to and fixated in relation to the nacelle housing structure 74. Thereby, a compact and efficient wind turbine rotor shaft arrangement with a direct coupled generator is provided. As illustrated, the generator is located in an axially center position between the first and second support points 12 and 32. The generator may also be located in an axially off-centered configuration on the radially outer rotor shaft 2 in relation to the support points 12 and 32.

According to an alternative embodiment, the rotor shaft 2 as depicted in FIG. 7 may be omitted. Instead, the rotor shaft may be integrally formed as portion of the hub unit 71. Thereby a more compact design of the wind turbine rotor shaft arrangement is provided, wherein the hub unit and rotor shaft are integrally formed and a rolling bearing, such as the first or second bearings 11 or 31, is mounted in and fixated directly to the hub unit 71. For example, the hub unit 71 may comprise an axially inwardly extending bearing mounting space, in which space the first bearing is mounted and into which space the supporting housing structure 70 extends for supporting the first rolling bearing.

Figure 8:
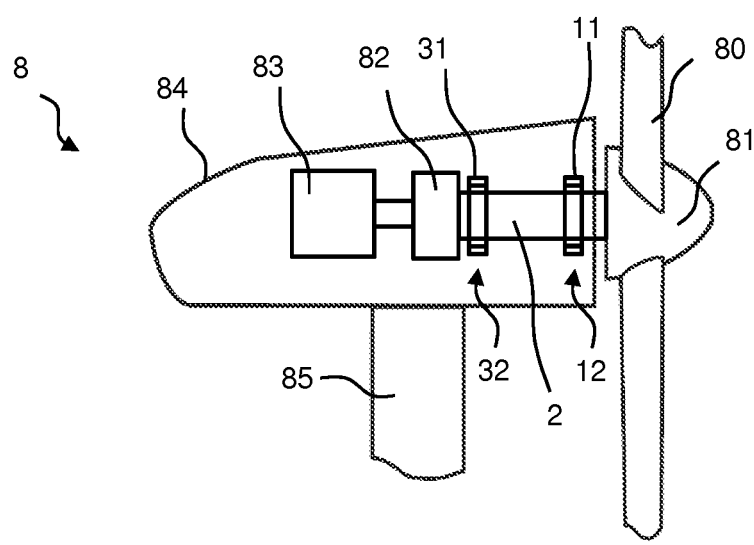
FIG. 8 is a schematic view of an embodiment of a wind turbine arrangement comprising a wind turbine rotor shaft assembly according to the present invention.

In FIG. 8, a schematic partial side view of a wind turbine assembly 8 comprising an embodiment of the wind turbine rotor shaft arrangement 1 according to the present invention is shown. As illustrated, wind turbine blades 80 and a hub unit 81 are attached to rotor shaft 2 which is supported at a first support point 12 by a first rolling bearing 11 and at a second support point 32 by a second rolling bearing 31. The arrangement 1 is arranged in a wind turbine framing construction, or housing, 84, arranged on a tower-like support member 85. Furthermore, the rotor shaft 2 is connected to a gear box 82 for shifting the rotational speed of the rotor shaft 2 before coupling the rotation of the rotor shaft 2 to a generator 83. Alternatively, the rotor shaft may be directly coupled to the generator without shifting the rotational speed of the rotor shaft with a gear box, as described in relation to FIG. 7.

It is noted that any one of the first and second bearings 11 and 31 of the above described exemplifying embodiments may be arranged in a similar manner with corresponding features as the rolling bearing described in relation to and illustrated in FIGS. 3a-b. Moreover, the rolling bearings 11 and 31 may for example be attached to the housing structures and rotor shaft 2 by means press-fitting techniques and/or by using a suitable locking device.

Furthermore, it should be noted that the invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality. A single apparatus or other unit may fulfill the functions of several items recited in the claims. The mere fact that certain features or method steps are recited in mutually different dependent claims does not indicate that a combination of these features or steps cannot be used to advantage.

The invention claimed is:

1. A wind turbine rotor shaft arrangement, comprising:
a nacelle housing having an inner nacelle surface;
a rotor shaft adapted to support wind turbine blades, the rotor shaft being hollow and having an inner shaft surface defining a bore therein,
a supporting housing structure positioned inside of the bore in the rotor shaft;
the supporting housing structure comprising a first housing structure disposed therealong for supporting the rotor shaft,
a first rolling bearing disposed between the supporting housing structure and the inner shaft surface of the rotor shaft and arranged to support, in a first axial direction, the rotor shaft in relation to the first housing structure at a first support point,
wherein the first rolling bearing is a single row, self-aligning bearing comprising an inner ring, an outer ring, and a set of rolling elements formed of rollers arranged in an intermediate configuration between the inner ring of the first rolling bearing and outer ring of the first rolling bearing,
wherein each roller of the first rolling bearing is a symmetrical bearing roller and has a curved raceway-contacting surface arranged in contact with both of a curved inner raceway of the inner ring of the first rolling bearing and in a curved outer raceway of the outer ring of the first rolling bearing,
wherein a contact angle between each roller of the first rolling bearing and at least one of the inner raceway of the first rolling bearing and outer raceway of the first rolling bearing is inclined in relation to the radial direction of the rotor shaft,
the supporting housing structure comprising a second housing structure adapted to support the rotor shaft,
a second rolling bearing disposed between the supporting housing structure and the inner shaft surface of the rotor shaft arranged to support, in a second, opposite axial direction, the rotor shaft in relation to the second housing structure at a second support point,
wherein the second rolling bearing is a self-aligning bearing comprising an inner ring, an outer ring, and a second set of rolling elements formed of rollers arranged in an intermediate configuration between the inner ring of the second rolling bearing and outer ring of the second rolling bearing,
wherein each roller of the second rolling bearing is a symmetrical bearing roller and has a curved raceway-contacting surface arranged in contact with a curved inner raceway of the inner ring of the second rolling bearing and in contact with a curved outer raceway of the outer ring of the second rolling bearing,
wherein a contact angle between each roller of the second set of rollers and the inner and/or outer raceway of the second rolling bearing is inclined in relation to the radial direction of the rotor shaft, and
a generator disposed in the nacelle housing and axially located between the first housing structure and the second housing structure, the generator comprising a rotor and a stator, wherein the rotor is directly attached to and abutting the rotor shaft without another component therebetween such that the rotor and the rotor shaft turn together, the stator being attached to the inner nacelle surface.

2. The wind turbine rotor shaft arrangement according to claim 1, wherein the inner ring of the first rolling bearing is arranged at the first support point, and the inner ring of the second rolling bearing is arranged at the second support point,
wherein the first support point and second support point are separately arranged in relation to each other along the axial direction of the rotor shaft.

3. The wind turbine rotor shaft arrangement according to claim 1, wherein the outer raceways of the first roller bearing and second roller bearing are facing away from each other in the axial direction.

4. The wind turbine rotor shaft arrangement according to claim 1, wherein the first rolling bearing and second rolling bearing are arranged to cooperate to axially locate the rotor shaft in relation to the first housing structure and second housing structure.

5. The wind turbine rotor shaft arrangement according to claim 1, wherein the second rolling bearing is one of:
a single row spherical roller bearing, or
a single row toroidal roller bearing.

6. The wind turbine rotor shaft arrangement according to claim 1, wherein the first housing structure and the second housing structure are both located within the nacelle framing.

7. The wind turbine rotor shaft arrangement according to claim 1, wherein the first housing structure and the second housing structure are integrally formed in supporting housing structure unit which is configured to be mounted in the nacelle framing.

8. The wind turbine rotor shaft arrangement according to claim 1, wherein the first rolling bearing is one of:
a single row spherical roller bearing, or
a single row toroidal roller bearing.

9. The wind turbine rotor shaft arrangement according to claim 1, wherein the contact angle of at least one of the first rolling bearing and second rolling bearing is between 10 and 45 degrees.

10. The wind turbine rotor shaft arrangement according to claim 1, wherein the contact angle of at least one of the first rolling bearing and second rolling bearing is between 15 and 35 degrees.

11. The wind turbine rotor shaft arrangement according to claim 1, wherein each housing structure is arranged radially outside the rotor shaft.

12. The wind turbine rotor shaft arrangement according to claim 1, further comprising a hub unit for supporting the wind turbine blades,
wherein rotor shaft is formed of a portion of the hub unit.

* * * * *